Patented Apr. 6, 1943

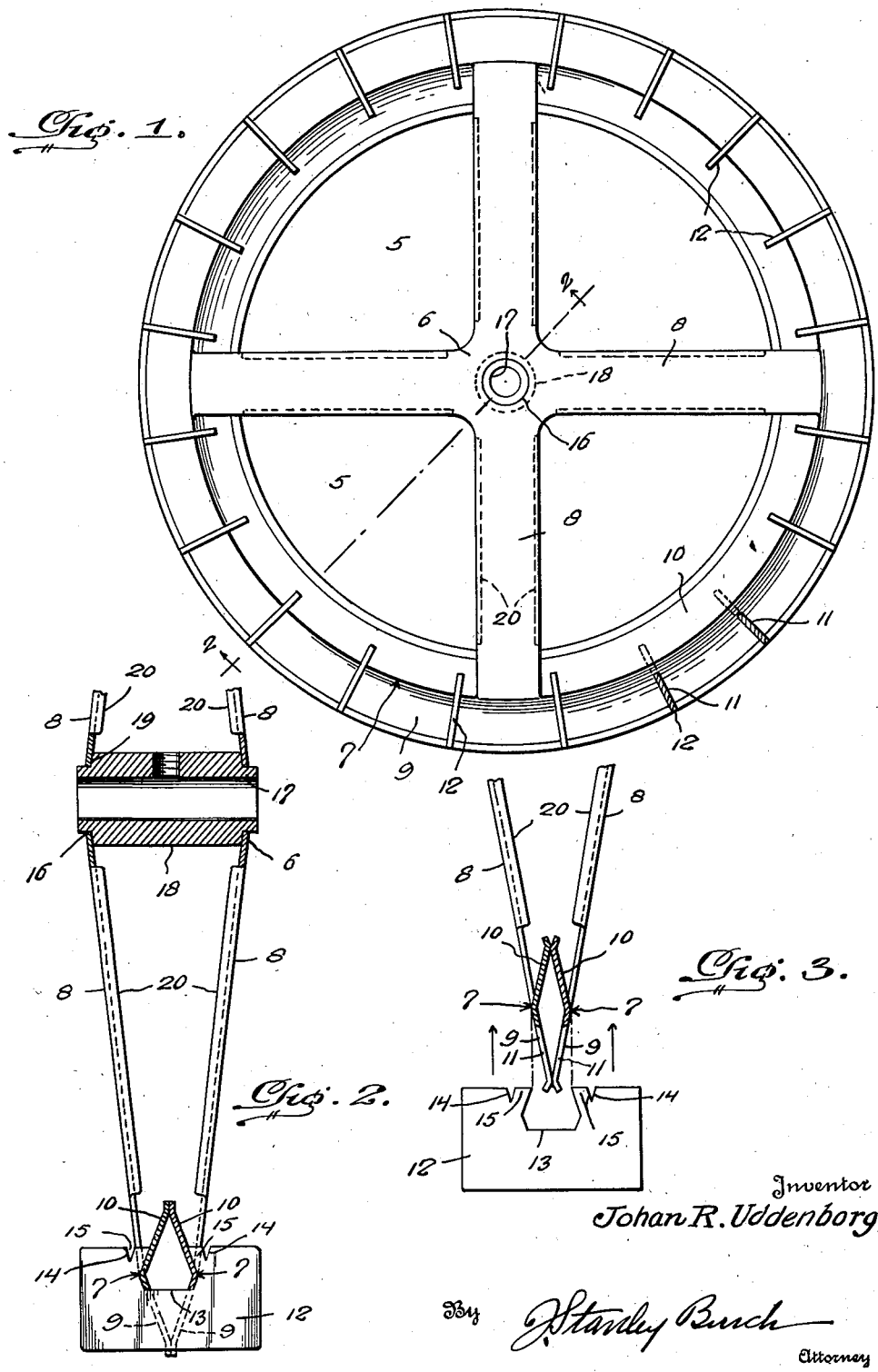

2,315,883

UNITED STATES PATENT OFFICE 2,315,883

TRACTION WHEEL

Johan R. Uddenborg, Chicago, Ill.

Application March 2, 1942, Serial No. 433,081

3 Claims. (Cl. 97—215)

This invention relates to traction wheels capable of general use, but particularly useful in connection with plant thinning machines of the type shown in my U. S. Letters Patent No. 1,998,745, dated April 23, 1935.

The primary object of the present invention is to provide a traction wheel composed of parts which may be readily and economically produced and quickly assembled to provide a wheel of simple and durable construction.

A specific object of the present invention is to provide a wheel of the above kind having a novel form of rim and cultivating and traction members or blades assembled and maintained in assembled relation without the use of separate securing means.

Other objects and features of the present invention will become apparent from the following description when considered in connection with the accompanying drawing.

In the drawing:

Figure 1 is a side elevational view of a traction wheel constructed in accordance with the present invention.

Figure 2 is a fragmentary radial section thereof taken on line 2—2 of Figure 1; and Figure 3 is a fragmentary developed view similar to Figure 2, illustrating the manner of assembling the cultivating and traction blades to the rim of the wheel.

Referring in detail to the drawing, the present traction wheel embodies side members formed from similar dished disks of springy sheet metal cut away as at 5 to provide central portions 6 and rim portions 7 connected by equally spaced radial spoke members 8. The rim members 7 have outwardly converging parts 9 which contact each other at their outer edges, and inwardly converging inner parts 10 which contact each other at their inner edges. Thus, the rim members 7 coact to provide a hollow rim substantially diamond-shape in cross-section, and compressible to reduce the major width thereof as illustrated in Figure 3 and for a purpose which will presently become apparent. The parts 10 extend between adjacent pairs of spoke members 8, and the outer parts 9 are provided at regular intervals with transversely aligned transverse slots 11 to receive the transverse cultivating and traction members or blades 12. The blades 12 are provided centrally of their inner edge portions with recesses 13 so that the inner portions of the blades may project inwardly and beyond the slots 11 when the blades are assembled within said slots as shown in Figure 2. The recesses 13 are of intricate form, and the parts of the blades at opposite sides of said recesses are notched as at 14 to provide flexible tongues 15. By laterally flexing the tongues 15 and compressing the rim to reduce the major width thereof as in Figure 3, the blades 12 may be forced into place from the position of Figure 3 to the position of Figure 2, the tongues 15 lying inwardly of the central widest portion of the rim when the assembly is completed, so that the blades 12 are retained in place without the use of separate fastening means. A tool of suitable form may then be used in the notches 14 to force the tongues 15 inwardly into snug contact with the rim so that any looseness of the blades 12 with respect to the rim will be eliminated. Of course, as soon as the pressure is released on the rim it will automatically expand again to normal form as in Figure 2 from the condition shown in Figure 3.

The central portions 6 of the side members are provided with central openings as at 16 receiving the reduced ends 17 of a hub member 18. By reducing the ends of the hub member 18 shoulders 19 are provided thereon which abut the inner faces of the central portions 6 and maintain the proper spaced dished form of the side members of the wheel. The side members may be securely attached to the hub by welding or the like, and the spokes 8 may be made strong and rigid by flanging the longitudinal edges thereof as at 20. The blades 12 project beyond opposite sides of the rim, but have their outer edges substantially flush with the outer edge of the V-shaped outer portion of the rim. Thus, the blades are effectively braced against loosening and they serve to cultivate the soil as well as to aid traction.

From the foregoing description, it will be seen that I have provided a traction wheel of the class described which may be conveniently and economically manufactured, and which is extremely durable in construction.

What I claim as new is:

1. A traction wheel comprising side members formed of similar dished disks of spring metal cut away to provide central portions and rim portions connected by uniformly spaced radial spokes, said central portions having aligned openings, said rim portions having outwardly converging outer parts and inwardly converging inner parts contacting at their free edges and coacting to provide a hollow rim compressible to temporarily reduce the major width thereof, the outer parts of said rim members being provided with aligned transverse slots at regular intervals, and transverse cultivating and traction blades inserted in said slots, said blades being centrally recessed at the inner edges thereof to provide the blades with inwardly projecting portions at opposite sides of said recesses adapted to extend inwardly beyond the central portion of the rim of greatest width, said recesses being undercut so that the blades will be retained in place upon return of the rim to normal width after being depressed for assembly of the blades thereof.

2. A traction wheel comprising side members formed of similar dished disks of spring metal cut away to provide central portions and rim portions connected by uniformly spaced radial spokes, said central portions having aligned openings, said rim portions having outwardly converging outer parts and inwardly converging inner parts contacting at their free edges and coacting to provide a hollow rim compressible to temporarily reduce the major width thereof, the outer parts of said rim members being provided with aligned transverse slots at regular intervals, and transverse cultivating and traction blades inserted in said slots, said blades being centrally recessed at the inner edges thereof to provide the blades with inwardly projecting portions at opposite sides of said recesses adapted to extend inwardly beyond the central portion of the rim of greatest width, said recesses being under-cut so that the blades will be retained in place upon return of the rim to normal width after being depressed for assembly of the blades thereof, said blades having notches in the inner edges thereof providing flexible tongues at opposite sides of the recesses adapted to be forced against the rim to tightly secure the blades in place after being assembled to the rim.

3. A traction wheel comprising side members formed of similar dished disks of spring metal cut away to provide central portions and rim portions connected by uniformly spaced radial spokes, said central portions having aligned openings, said rim portions having outwardly converging outer parts and inwardly converging inner parts contacting at their free edges and coacting to provide a hollow rim compressible to temporarily reduce the major width thereof, the outer parts of said rim members being provided with aligned transverse slots at regular intervals, and transverse cultivating and traction blades inserted in said slots, said blades being centrally recessed at the inner edges thereof to provide the blades with inwardly projecting portions at opposite sides of said recesses adapted to extend inwardly beyond the central portion of the rim of greatest width, said recesses being under-cut so that the blades will be retained in place upon return of the rim to normal width after being depressed for assembly of the blades thereof, and a hub having reduced ends fitted in the opening of said central portions and provided with shoulders abutting the inner faces of said central portions, said central portions being united to said hub.

JOHAN R. UDDENBORG.